Feb. 6, 1934.　　　　H. W. ALDEN　　　　1,946,051
AUTOMOTIVE AXLE
Filed Sept. 13, 1929　　　2 Sheets-Sheet 2

INVENTOR:
H. W. Alden
HIS ATTORNEYS

Patented Feb. 6, 1934

1,946,051

UNITED STATES PATENT OFFICE 1,946,051

AUTOMOTIVE AXLE

Herbert W. Alden, Detroit, Mich., assignor to The Timken-Detroit Axle Company, Detroit, Mich., a corporation of Ohio Application September 13, 1929
Serial No. 392,425

3 Claims. (Cl. 74—99)

Figure 1:
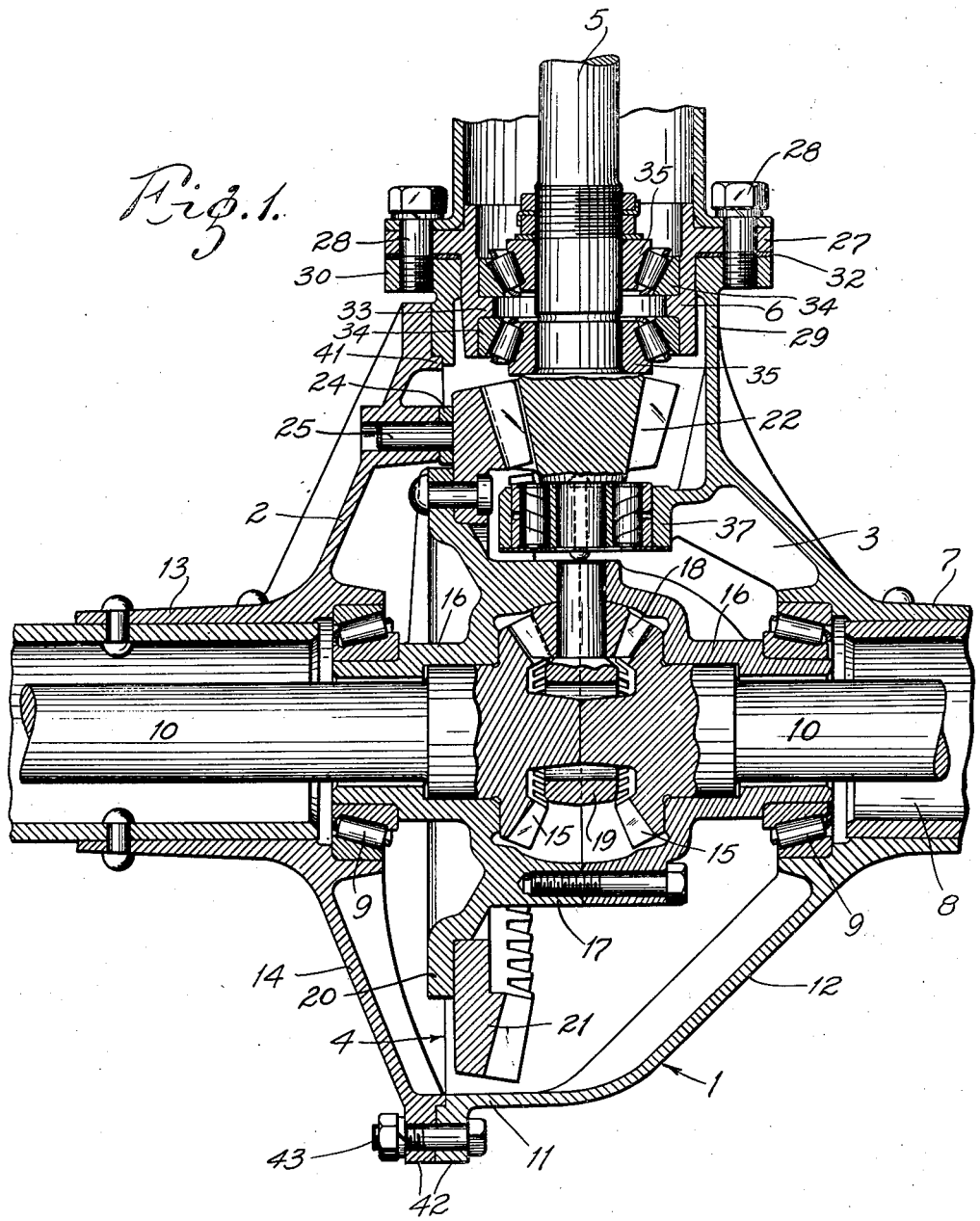
Figure 2:
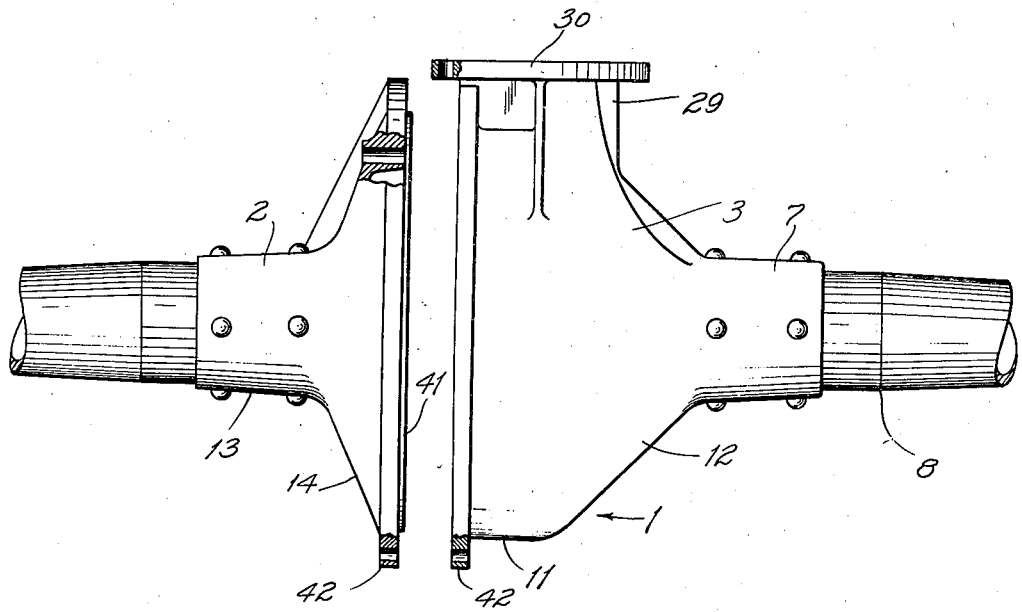
Figure 3:
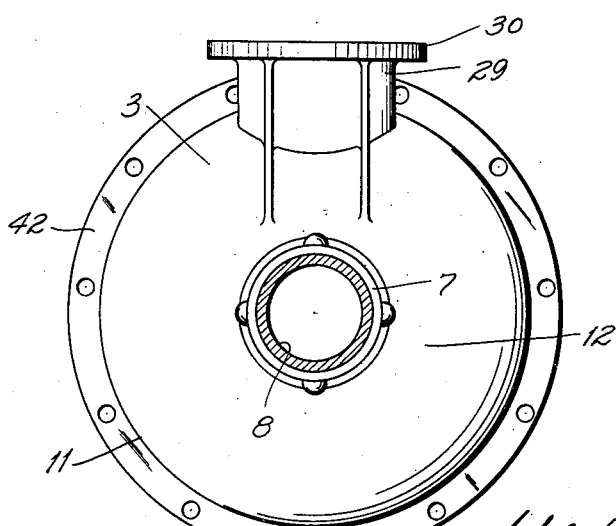

This invention relates to automotive axles and has for its principal objects to simplify construction, to facilitate adjustment and assembly of parts, and to produce a strong, compact and durable axle. The invention consists principally in making the axle housing of two members that are separably connected together in a plane at right angles to their longitudinal axis and offset far enough from the axis of the propeller shaft to permit the propeller shaft carrier to be mounted wholly on the larger axle member. The invention also consists in the parts and in the arrangements and combinations of parts hereinafter described and claimed. In the accompanying drawings, which form part of this specification and wherein like numerals refer to like parts wherever they occur, Fig. 1 is a horizontal longitudinal section of an automotive axle embodying my invention, Fig. 2 is a view, mainly in elevation, of the two members of the axle housing separated from each other; and Fig. 3 is a view, mainly in elevation, of the larger axle housing member.

My axle belongs to the well known type of automotive axle, wherein the driving shaft sections that transmit driving power to the wheels have their inner ends connected together by a differential mechanism all enclosed in a load supporting housing consisting of two tubular portions connected together by an enlarged portion that constitutes the housing for the differential mechanism. Heretofore it has been customary to make the differential housing in two more or less hemispherical sections that meet endwise in the plane of the axis of the propeller shaft; and it has also been customary to provide both differential housings with concave lateral extensions that meet and form a nosing to which the propeller shaft carrier is secured.

According to the present invention, the differential housing portion 1 of the axle is made of two axle members 2, 3 so disposed that the "split" 4 between them is far enough from the axis of the propeller shaft 5 to permit the carrier 6 of said shaft to be mounted wholly on the main or longer member 3. By this arrangement, the main member 3 of the axle housing comprises, first, a hub portion 7 secured to or integral with a tubular extension 8 of the axle housing and adapted also to form a seat for a roller bearing 9 for a driving shaft section 10, second an enlarged cylindrical end portion 11, and third, an oblique or conical portion 12 joining said hub and said enlarged cylindrical portion and integral with both. The second or shorter member 2 of the axle housing has a hub portion 13 secured to or integral with a tubular extension and a conical portion 14 that widens or flares out to the diameter of the main member. At their meeting faces, the main axle member 3 has an annular groove and the shorter member has an annular rib 41 seated in said groove, and their outer margins are formed into thick flanges 42 which are provided with alined bolt holes for clamping bolts 43.

The differential mechanism comprises two opposed bevel gears 15 which are preferably made integral with the respective axle shaft sections 10 which are rotatably mounted in the hollow extended hubs 16 of the differential casing 17. The hubs are provided with roller bearings 9 that are seated in the hubs of the axle housing members as above mentioned. Between said opposed bevel gears 15 are a series of bevel pinions 18 each rotatably mounted on an arm of a spider 19 which is mounted concentric with said bevel gears in or on said casing 17. Said casing comprises two hollow sections secured together endwise. The casing section comprises a hub portion with a roller bearing between it and the adjacent hub portion of the axle housing member, and itself forming a bearing for the axle shaft section, together with an enlarged portion adapted to receive the differential pinions. Radial grooves are formed in the meeting faces of said casing sections to receive the arms of the spider, which are clamped in position by the cap screws that hold the casing sections together. One section of said casing is provided at the outer end of its enlarged portion with an outwardly extending flange 20 on which is seated a bevel ring gear 21 concentric with the axle shafts and arranged to engage and be driven by a pinion 22 on the propeller shaft 5. Said ring gear faces inwardly, that is, toward the spider, thus affording space at a desirable location for a bearing for the inner end of the propeller shaft.

Opposite the point of contact between the propeller shaft pinion and the ring gear, is a wear plate 24 that is provided with a pin 25 or stem that projects into a hole provided therefor in the disk portion of the smaller member of the axle housing. By this arrangement, the ring gear is supported against the thrust of the pinion gear.

The propeller shaft 5 is mounted in a carrier 6 of generally cylindrical form which is provided with a circumferential flange 27 perforated to receive cap screws 28. In order to accommodate this propeller shaft carrier, a hollow nosing or extension 29 is formed on the front side of the main member of the axle housing. The end of said nosing extends beyond the margin of the shorter axle housing member and is provided with a circumferential flange 30 that is provided with tapped holes in position to receive the cap screws 28 that extend through the flange of the propeller shaft carrier. By this arrangement, the propeller shaft carrier is mounted wholly on the main member of the differential housing.

As stated above, the propeller shaft carrier is of cylindrical form with a circumferential flange arranged to be fastened by bolts or screws to the end of the nosing of the axle housing. By interposing shims 32 between the end of said nosing and said circumferential flange and varying the thickness, said shaft may be adjusted endwise and the propeller shaft pinion which is mounted on or integral therewith may be adjusted in relation to the ring gear of the differential mechanism. On the inside of said propeller shaft carrier is an annular rib 33 each side face of which forms a shoulder or abutment for the large end of a cup 34 of a taper roller bearing seated therein, the cones 35 of the respective bearings being mounted on said propeller shaft. The rear end of the propeller shaft extends rearwardly beyond the pinion 22 thereof and is provided with a cylindrical roller bearing whose inner raceway member is mounted on the end portion of said shaft and whose outer raceway member is seated in a recess provided therefor in a lug or projection 37 from the inner face of the nosing of the axle housing and preferably integral therewith. By thus extending the inner end of the propeller shaft inwardly beyond the teeth of the ring gear, the bearing thereof is located in a very desirable position that would otherwise be unoccupied and where it can be given excellent support on the nosing itself. By using a cylindrical bearing in this position, the in and out adjustment of the propeller shaft may be made without affecting such cylindrical bearing.

It is obvious from the foregoing description that the work of mounting and adjusting the parts is very greatly simplified by my invention in comparison with the practice heretofore customary. It is also obvious that the new construction is more compact and strong and less liable to get out of order than earlier constructions.

What I claim is:

1. An automotive axle construction comprising a load supporting housing comprising two members joined in a plane transverse to the longitudinal axis and one of said members having a forwardly extending nosing integral therewith, shaft sections in said housing, differential mechanism in said housing connected to the inner ends of said shaft sections, a propeller shaft carrier in said nosing, a bevel drive propeller shaft mounted in said carrier and operatively connected to said differential mechanism to drive the same, said nosing having a seat integral therewith for a cylindrical bearing for the inner end of said propeller shaft, said shaft carrier having an outer annular flange which overlaps and is secured to the end of said nosing, said carrier also having a rib inside thereof and taper bearing cups seated in said carrier on opposite sides of said rib, and said propeller shaft having bearing cones with taper rollers interposed between said cups and cones.

2. An automotive axle construction comprising a load supporting housing, shaft sections therein, differential mechanism therein connected to the inner ends of said shaft sections and having a bevel ring gear, a propeller shaft having a bevel pinion engaging said ring gear to drive the same, a carrier for said shaft, said housing comprising two members detachably connected together endwise in a plane transverse to the longitudinal axis of said housing, one of said members having its inner end enlarged to receive the differential mechanism and having a lateral nosing on said enlarged portion with an annular seat that overlaps said plane and is adapted to receive the propeller shaft carrier and the other member having a discoidal enlargement at its inner end adapted to be secured to the inner end of said first member, said ring gear having its teeth facing towards the first mentioned housing member and the second mentioned housing member having a wear element for the back of the ring gear opposite its point of contact with the bevel pinion.

3. An automotive axle construction comprising a load supporting housing, alined shaft sections having integral therewith opposing bevel gears near their adjacent ends, a spider between said gears having pinions engaging said gears, and a casing comprising two parts secured together, each part having an elongated hollow hub journaled on a shaft section and in a bearing in the housing and having a shoulder for the gear of its shaft section to abut against, a ring gear on said casing, a propeller shaft having a pinion engaging said ring gear, and an endwise adjustable carrier for said propeller shaft, said housing comprising two members detachably connected together endwise in a plane transverse to the longitudinal axis of said housing and far enough from the axis of the propeller shaft to clear the body portion of said carrier, whereby said carrier may be mounted wholly on one of said members.

HERBERT W. ALDEN.